United States Patent [19]
Weldin et al.

[11] Patent Number: 5,974,960
[45] Date of Patent: Nov. 2, 1999

[54] CONDUIT COMPRESSION FIXTURE

[75] Inventors: Larry G. Weldin, Anderson; Darin P. Magera, Simpson; Maxie G. Chumley, Spartanburg, all of S.C.

[73] Assignee: Westinghouse Air Brake Company, Wilmerding, Pa.

[21] Appl. No.: 09/056,925

[22] Filed: Apr. 8, 1998

[51] Int. Cl.[6] .................................................. B30B 1/20
[52] U.S. Cl. ..................... 100/289; 100/214; 100/295; 138/119
[58] Field of Search ........................... 100/35, 214, 231, 100/289, 295; 138/97, 119

[56] References Cited

U.S. PATENT DOCUMENTS

| | | | |
|---|---|---|---|
| 50,568 | 10/1865 | Du Pont | 100/35 |
| 698,728 | 4/1902 | McKinnon | 100/289 |
| 819,984 | 5/1906 | Dexter | 100/289 |
| 3,143,146 | 8/1964 | Kennedy | 138/119 |

*Primary Examiner*—Stephen F. Gerrity
*Attorney, Agent, or Firm*—James Ray & Associates

[57] ABSTRACT

A fixture for axially compressing an axially compressible tube. The fixture comprises two, spaced apart clamp blocks for receiving and clamping the tube against relative movement in the blocks, and a base structure for supporting such blocks, with at least one of the blocks being slideable thereon. A device is provided for effecting relative translation of the blocks on the base structure to longitudinally compress and shorten the tube.

9 Claims, 1 Drawing Sheet

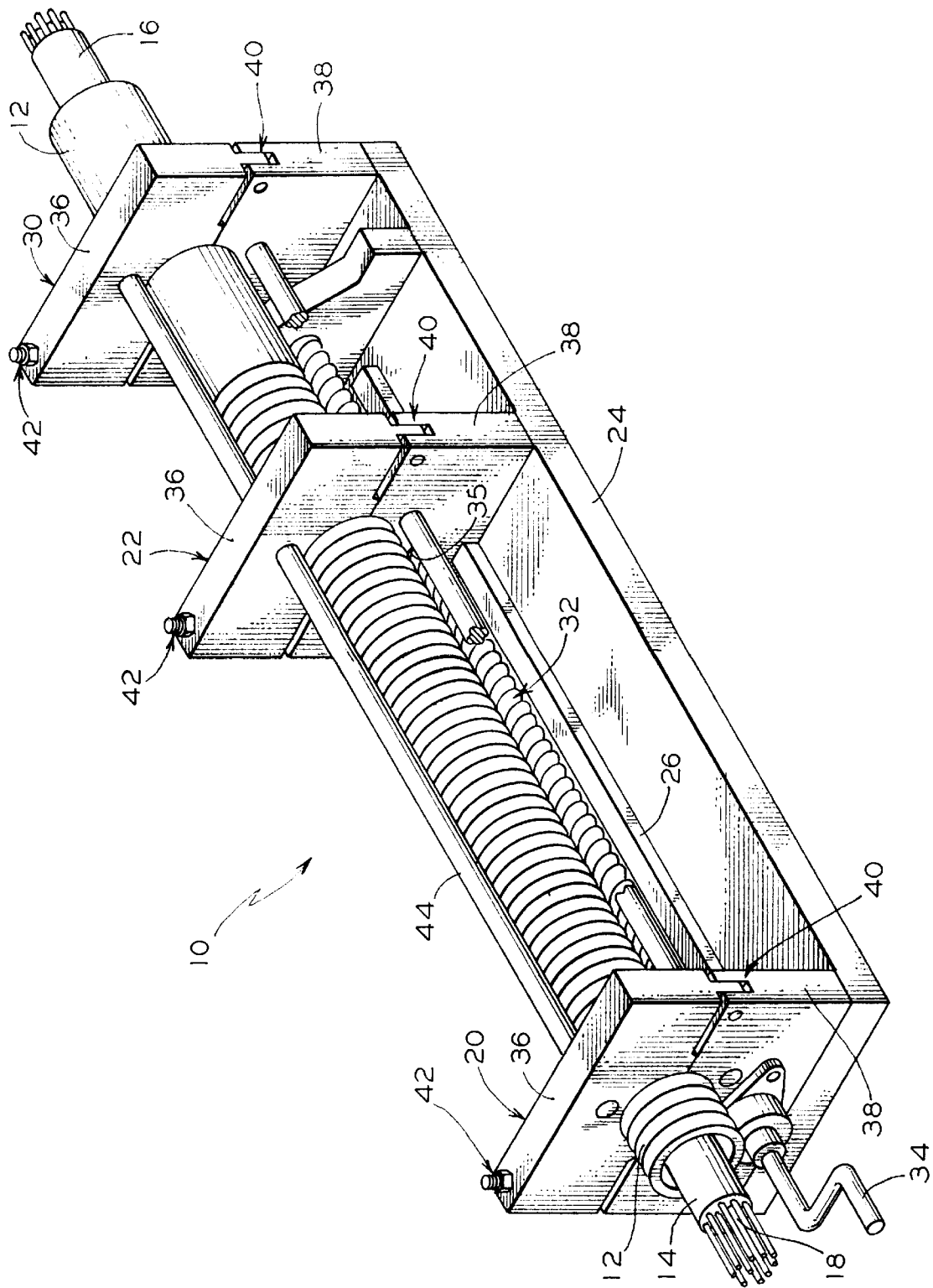

CONDUIT COMPRESSION FIXTURE

FIELD OF THE INVENTION

The present invention relates, in general, to a compression fixture and, more particularly, this invention relates to a fixture for compressing and/or shortening the length of a longitudinally compressible tube and/or conduit.

BACKGROUND OF INVENTION

When a fixed length of an unterminated wire conductor, wire harness, electrical cable or optical fiber is disposed within a finite length of compressible tubing that exhibits substantially the same length of such unterminated wire conductor, wire harness, electrical cable or optical fiber it is necessary to shorten the length of the tubing to access the ends of such unterminated wire conductor, wire harness, electrical cable or optical fiber for the express purpose of terminating such wire conductor, wire harness, electrical cable or optical fiber.

What is therefore needed is a device or fixture that will temporarily shorten an axially compressible tube or conduit so that the unexposed ends of an unterminated wire conductor, wire harness, electrical cable or optical fiber which are contained within such compressible tube become exposed and thereby made available for termination.

SUMMARY OF INVENTION

The present invention provides such a device or fixture in the form of two clamp blocks supported on a base plate for relative movement thereon in a process of at least temporarily shortening a compressible conduit or tube. The clamp blocks grip the conduit or tube in such a manner that does not allow the conduit or tube to slip within such clamp blocks. Means are provided on the fixture for effecting a required relative movement of the clamp blocks and a plurality of longitudinal bars extending between the clamp blocks are provided for preventing undesirable lateral movement of the conduit or tube during the compression process. When one clamp block is moved toward the other clamp block the conduit or tube is shortened to expose the ends of a cable or conductor located within such conduit or tube so that the ends of the cable or conductor can be terminated with appropriate connectors. When the compression being exerted on the conduit or tube is released by the clamp blocks, the conduit or tube expands to substantially its original length and, thus, expands to the location of the appropriate connectors terminating the cable or conductor.

OBJECTS OF THE INVENTION

It is, therefore, one of the primary objects of the present invention to provide an apparatus for compressing the length of a protective compressive conduit or tube disposed around at least one of an unterminated wire conductor, wire harness, electrical cable or optical fiber so that at least one end of such wire conductor, wire harness, electrical cable or optical fiber can be terminated.

Another object of the present invention is to provide an apparatus for compressing the length of a protective compressive conduit or tube disposed around at least one of an unterminated wire conductor, wire harness, electrical cable or optical fiber which is relatively inexpensive to manufacture.

Still another object of the present invention is to provide an apparatus for compressing the length of a protective compressive conduit or tube disposed around at least one of an unterminated wire conductor, wire harness, electrical cable or optical fiber which is relatively easy to operate.

Yet another object of the present invention is to provide an apparatus for compressing the length of a protective compressive conduit or tube disposed around at least one of an unterminated wire conductor, wire harness, electrical cable or optical fiber which is can be readily adapted to different lengths of conduit or cable to be compressed therein.

BRIEF DESCRIPTION OF THE DRAWING

In addition to the objects and advantages to the present invention described above, various other objects and advantages of the conduit or tube compression apparatus will become more readily apparent to those persons skilled in the relative art from the following more detailed description of the invention, particularly, when such description is taken in conjunction with the attached drawing figure and with the appended claims, the figure showing an isometric view of the fixture of the invention for shortening conduits or tubes in accordance with the principles of the presently preferred embodiment of the invention.

PREFERRED EMBODIMENT OF THE INVENTION

Referring now, more particularly, to the figure, a fixture, generally designated 10, is shown for longitudinally compressing the length of a compressible tube or conduit 12 along its axis. The tube or conduit 12 being at least temporarily axially shortened in a manner such that it will return to substantially its original length when the force at which the tube or conduit 12 is compressed is released.

More particularly, tube or conduit 12 is illustrated as having a corrugated wall at least along a portion of its length dimension so that its length can be temporarily shortened for the purpose of accessing one or both ends 14 and 16 of an electrical or optical conductor, coaxial cable or wire harness 18 for the purpose of terminating such electrical or optical conductor, coaxial cable or wire harness 18 with one or more electrical or optical connectors (not shown).

It can be appreciated that if a tube or conduit 12 of a finite length contains either a wire or cable of substantially the same or a somewhat shorter length, the tube or conduit 12 will need to be compressed axially if one is to expose and access one or both of the ends 14 and 16 of the wire or cable.

Fixture 10 accomplishes this function by providing relatively translatable clamp blocks, generally designated 20 and 22, for receiving and clamping a tube or conduit 12 against any relative movement in such clamp blocks 20 and 22. As shown, these clamp blocks 20 and 22 are mounted on a base means 24 and on a linear guide track or rail 26 extending between the clamp blocks 20 and 22 and in general parallel alignment with tube or conduit 12 when it is mounted in such clamp blocks 20 and 22.

In the figure, such guide track or rail 26 extends through at least one of the clamp blocks 20 and 22 so that the at least one of the clamp blocks 20 and 22 is translatable along the guide track or rail 26 on base means 24. In the apparatus 10 of the figure, clamp block 20 is fixed on base means 24.

A third clamp block, generally designated 30, is shown in the figure mounted on base means 24 adjacent the end remote from such fixed clamp block 20 for loosely containing one end of such tube or conduit 12. Clamp block 30, for example, can hold a section or end portion of the tube or conduit 12 if such tube or conduit 12 is unduly flexible or lengthy so that the integrity of the portion of the tube or conduit 12 positioned between the compression clamp blocks 20 and 22 can be easily maintained for the compression process. Clamp block 30 guides the tube or conduit 12 as it is longitudinally compressed by fixture 10.

According to the presently preferred embodiment of this invention, the compression process is effected by moving the clamp block 22 toward the fixed clamp block 20 after a tube or conduit 12 is clamped in such clamp blocks 20 and 22 in a manner that does not permit relative movement of such tube or conduit 12 in the clamp blocks 20 and 22.

For this purpose, the inside clamping surfaces of such clamp blocks 20 and 22 provide an opening sized to that of the outside diameter of the tube or conduit 12 and they can be provided with corrugations (not visible in the figure) to receive and seat the corrugations of the tube or conduit 12. The material of the tube or conduit 12 is at least sufficiently rigid to the degree that its corrugated wall will not collapse inwardly under the clamping force of such clamping blocks 20 and 22.

On the other hand, the guide clamp block 30 does not have any inner corrugations as its purpose is to hold and guide such tube or conduit 12 rather than clamping it.

With a tube or conduit 12 so clamped, the clamp block 22 (in the figure) is mechanically translated toward the clamp block 20 to temporarily axially shortened the tube or conduit 12. As shown in the figure, this is effected by an axially fixed, threaded shaft 32 extending between such clamp blocks 20 and 22, with the treads of the shaft 32 seated in threads (not visible in the figure) provided in an opening 35 of such movable clamp block 22.

The threaded shaft 32 is rotated in such clamping blocks 20 and 22 by a crank arm or handle 34 located in front of and mounted on the outward face of the fixed clamp block 20. The treads of the threaded shaft 32 in the movable clamp block 22 are effective in translating such clamp block 22 on base means 24 when such threaded shaft 32 is rotated.

Other means, however, can be used to accomplish such relative movement of the clamp blocks 20 and 22 without departing from the scope of the present invention. For example, either a hydraulic or pneumatic cylinder can be used, or a mechanical arm can be situated and suitably connected to effect the necessary relative movement of such clamp blocks 20 and 22.

The clamp blocks 20 and 22, preferably, include a removable upper clamp portion 36 and lower fixed base portion 38 having inwardly facing surfaces (not visible in the figure) configured to receive the tube or conduit 12 and to provide the required clamping action.

The movable upper clamp portion 36 can be removed from the lower fixed base portion 38 to permit disposal of such tube or conduit 12 in the lower portion of each clamp block 20 and 22. As shown in the figure, the clamp portions are provided with a hinge mechanism 40 that allows rotation of the movable upper clamp portion 36 to and from the lower fixed base portion 38. The two clamp portions 36 and 38 are shown secured together on tube or conduit 12 by a nut and bolt combination 42, though other means can be employed to fasten and unfasten the clamp portions 36 and 38.

When a tube or conduit 12 is axially compressed by fixture 10 it has a tendency to bow outwardly from the axis of such tube or conduit 12 at a generally right angle to the axis of such tube or conduit 12. To prevent this, the fixture 10 can be provided with three fixed guide rods, generally designated 44, extending between the clamp blocks 20, 22 and 30 and radially spaced apart at least at a distance sufficient to accommodate the outer diameter of the tube or conduit 12.

In the case of the translatable clamp block 22, such guide rods 44 pass through the clamp block 22 so that such clamp block 22 can move on and relative to the guide rods 44. Any substantial lateral or vertical movement of the tube or conduit 12 during the compression process is thus prevented by the guide rods 44. If the cross-section of tube or conduit 12 is somewhat smaller than the radial confining space of the guide rods 44, the tube or conduit 12 will be able to move only to the fixed location(s) of one or more of the guide rods 44.

The procedure for compressing a tube or conduit 12 by such fixture 10 is both rapid and relatively simple, i.e., the blocks 20, 22 and 30 are opened, if closed, by unfastening (if fastened) the upper movable clamp portion 36 from the lower fixed base portion 38, and placing the tube or conduit 12 in the lower fixed base portions 38 of the blocks 20, 22 and 30.

If the translatable clamp block 22 has been moved to or toward the fixed clamp block 20, then clamp block 22 is moved away from such clamp block 20 by use of the translating mechanism such as the threaded screw 32 and crank arm 34. In this manner, an appropriate distance is provided between the two clamp blocks 20 and 22 to effect a compression of the tube or conduit 12 suitable to expose the ends 14 and 16 of cable 18.

The compression is effected, again, by operation of the block translating mechanism 32, and after connectors or terminals (not shown) are attached to cable ends 14 and 16, the translating mechanism 32 is operated to move the clamp block 22 away from the clamp block 20 to permit the tube or conduit 12 to expand to the connectors or terminals.

When the terminating process is completed, the upper movable clamp portions 36 are removed or rotated from lower fixed base portions 38 to allow removal of the tube or conduit 12 from such fixture 10 and permitting disposal of a new tube or conduit 12 therein for effecting the same tube compression and cable terminating process in a rather simple, easy manner.

While the presently preferred embodiment for carrying out the instant invention has been set forth in detail above, those persons skilled in the art to which this invention pertains will recognize various alternative ways of practicing the invention without departing from the spirit and scope of the patent claims appended hereto.

What is claimed is:

1. A fixture for axially compressing an axially compressible tube, said fixture comprising:

(a) a pair of spaced apart clamp blocks for receiving and clamping such tube against relative movement in said clamp blocks, at least a first one of said pair of said spaced apart clamp blocks being movable with respect to a second one of said pair of said spaced apart clamp blocks;

(b) base means for supporting said pair of said spaced apart clamp blocks with said at least said first one of said pair of said spaced apart clamp blocks being slideable thereon; and (c) means for effecting relative translation of said pair of said spaced apart clamp blocks on said base means to longitudinally compress and shorten such tube.

2. The fixture, according to claim 1, wherein said fixture further includes means for limiting right angle movement of such tube from its axis during a compression process.

3. The fixture, according to claim 2, wherein said means for limiting said right angle movement of such tube includes a predetermined plurality of guide rods extending between said relatively moveable clamp blocks in close parallel relation to such tube when such tube is clamped in said relatively movable clamp blocks.

4. The fixture, according to claim 3, wherein said means for limiting said right angle movement of such tube includes at least three guide rods extending between said relatively moveable clamp blocks in close parallel relation to such tube when such tube is clamped in said relatively movable clamp blocks.

5. The fixture, according to claim 1, wherein said fixture further includes a third block located on said base means and sized to loosely receive such tube therein.

6. The fixture, according to claim 1, wherein said fixture further includes a guide track extending longitudinally between said clamp blocks in general parallel alignment with such tube when such tube is clamped in said clamp blocks.

7. The fixture, according to claim 6, wherein said guide track extending longitudinally between said clamp blocks in general parallel alignment with such tube when such tube is clamped in said clamp blocks is a rail.

8. The fixture, according to claim 1, wherein said means for effecting relative translation of said clamp blocks is a threaded shaft extending between said clamp blocks and threaded through one of said clamp blocks for translating said one of said clamp blocks when said threaded shaft is rotated.

9. The fixture, according to claim 8, wherein said means for effecting relative translation of said clamp blocks includes a crank arm connected to one end of said threaded shaft for effecting rotation of said threaded shaft in said one of said clamp blocks.

* * * * *